Aug. 16, 1955
G. WILSON ET AL
2,715,337
VOLUME INDICATOR FOR CONTAINERS
Filed July 7, 1953
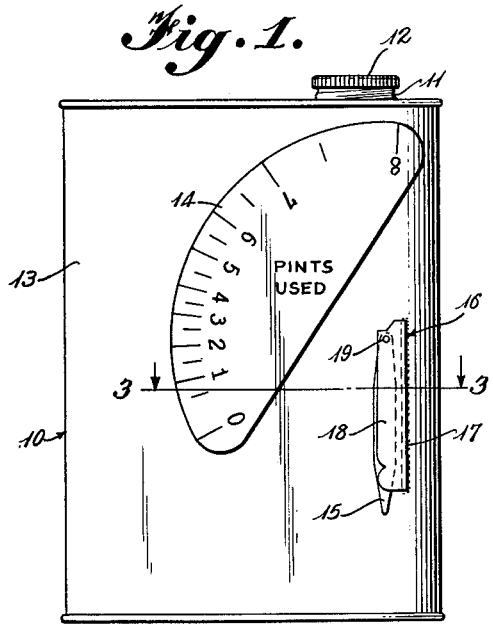
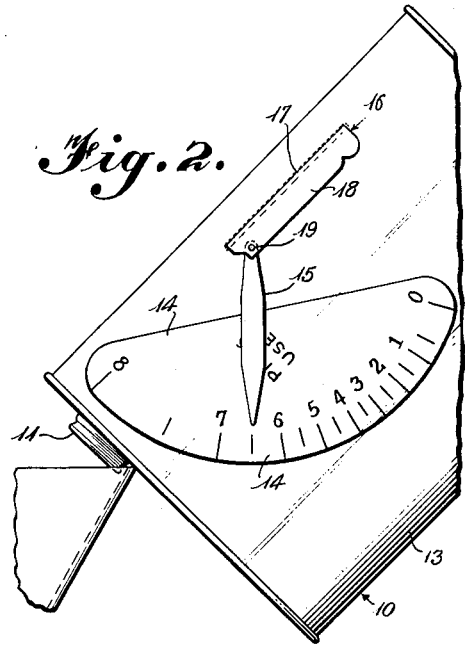
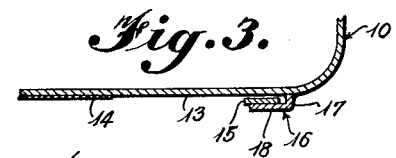
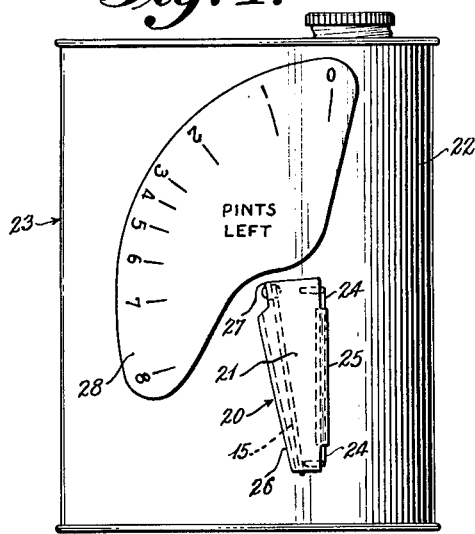
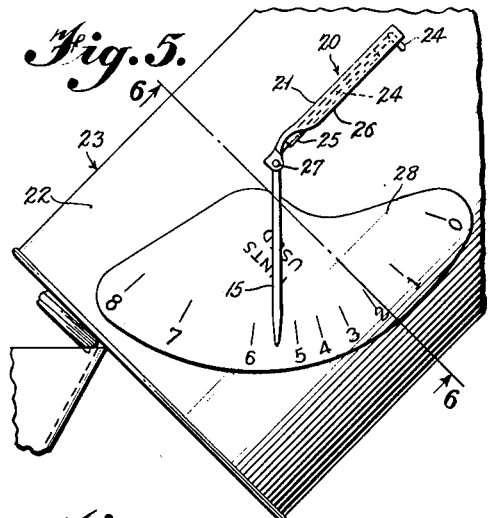
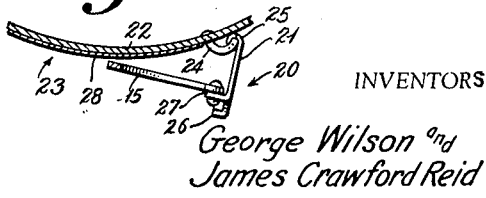
INVENTORS
George Wilson and
James Crawford Reid
BY *Stevens, Davis, Miller and Mosher*
ATTORNEYS

# United States Patent Office 2,715,337
Patented Aug. 16, 1955

2,715,337

VOLUME INDICATOR FOR CONTAINERS

George Wilson, East Malvern, Victoria, and James Crawford Reid, Glen Iris, Victoria, Australia Application July 7, 1953, Serial No. 366,528

Claims priority, application Australia December 9, 1952

5 Claims. (Cl. 73—290)

This invention relates to a volume indicator for a container and more particularly to a volume indicator for a container of the type that is tipped in order to pour out the fluent material contents thereof.

Containers of the type that are tipped in order to remove the fluent material therefrom offer a particular problem of volume indication not present in containers which are not so tipped when pouring is effected. The usual type of visual indicator such as a sight glass or indicator coupled with a float is of course not feasible. These types are predicated on the container remaining in a fixed position while the contents thereof are being removed.

It is therefore an object of this invention to provide an accurate and simple volume indicator for a container of the type that is tipped when pouring the fluent material therefrom.

It is a further object of this invention to provide such a volume indicator which is capable of indicating either the volume remaining in the container or the volume removed therefrom, all of these indications being available during the actual pouring operation.

These and other objects will be apparent from the following description of the accompanying drawings:

Figure 1 is a front elevational view of the container and volume indicator constructed in accordance with this invention;

Figure 2 is a view of the container of Figure 1 during the pouring operation and showing the actual volume indication;

Figure 3 is a view taken along the line 3—3 of Figure 1;

Figure 4 is a view similar to Figure 1 showing another embodiment of the invention;

Figure 5 is a view of the container of Figure 4 during the pouring operation but with a different scale; and Figure 6 is a view along the line 6—6 of Figure 5.

Referring first to Figure 1, the container 10 in this embodiment is rectangular in cross-section and has four relatively flat sides or exterior walls. The pour spout is indicated at 11 and has a cap 12 threaded thereto. To one of the exterior walls indicated at 13, which is preferably the widest wall of the rectangle above referred to, is mounted a graduated scale 14. This scale may be applied to the exterior wall in any convenient manner, such as by embossing or the scale may be mounted as a separate label to the container wall. This scale may be calibrated according to the volume used; in other words, the volume poured out during the pouring operation, or it may be calibrated according to the volume still remaining in the container. A pointer 15 is freely pivotally carried by means mounted to the container. This means may take several forms, for instance, it may be merely a stud projecting from the exterior wall of the container and the pivotal end of the pointer is then mounted to this stud. As shown in Figure 1, however, a housing 16 is provided. This housing may take several forms. As particularly shown in Figures 1 and 3 the housing 16 is a substantially rectangular piece of material such as a metal. This piece of metal is bent to an approximate L-shape in cross-section and one leg 17 of the L, and preferably the edge of this leg, is affixed to the wall 13 in any convenient way. The other leg 18 extends along but is spaced from the wall 13. This forms a protecting strip or housing indicated at 16 having an open side between the leg 18 and the wall 13. The pointer 15 is mounted for free pivotal movement to a stud 19, which stud extends from the leg 18 toward the wall 13. It will be noted that the leg 16 is mounted along a line on the wall 13, which line is parallel to the vertical axis of the container 10. Therefore, since the pointer 15 is freely pivotal on stud 19 it assumes a vertical position such as shown in Figure 1 when the container is in its normal non-pouring vertical position. The housing, then, extends over the pointer when it is in its normal non-pouring position. The housing is elongated to substantially cover the pointer.

When the container is tipped for pouring as shown in Figure 2 the pointer 15 pivots freely from its position as shown in Figure 1 to its position as shown in Figure 2. Of course the free pivoting of the pointer 15 assures that it will seek this downwardly pointing vertical position. The scale 14 is so positioned on and associated with the exterior wall 13 to properly cooperate with the pointer 15 so that the pointer during the pouring operation always points to the correct position on the graduated scale. The scale is so associated with the container wall 13 that when the fluent material just begins to pour from the spout 11 the zero indication is immediately under the pointer 15. Also the final calibration on the scale is so fixed that when the final volume has left the container, this maximum or final volume indication will be immediately under the pointer 15.

The calibration of this scale depends on the pour angle of the container. The pointer is located on the container in a position relative to the pour spout such that when the container is tilted in order to pour out the contents thereof the pointer will swing away from the housing 16 at an angle depending on the angle at which the container is held. That is to say, the greater the angle at which the container is tilted the greater will be the angle between the pointer and the housing. If the container before being tipped contains a known quantity of material, the amount of material poured from the container will depend on the angle at which the container is tilted at the end of the pouring operation. The scale provided on the side of the container is calibrated in relation to the shape and volume of the container, the position of the spout, etc., so that the quantity of material poured from the container when the container is held at a particular angle until the material ceases to flow out is shown on the scale by the position relative thereto of the pointer. The scale of graduations preferably form an arc extending around the pivot axis of the pointer.

As shown in Figure 2 the pints used at the particular pour angle indicated are 6.5. This means that 6.5 pints have been poured out from the container 13 at the particular pour angle indicated when the fluent material ceases to flow. If two separate pouring operations are to take place without refilling the container a mark can be made on the scale after the first operation to indicate the new zero position, or a second pointer not so freely pivotal can be used and set to the new zero position.

What has thus far been described is a container and volume indicator wherein the container has flat sides. The embodiment of Figures 4 to 6 illustrate a container having curved sides. In such an embodiment it is preferable that the pivotal end of the pointer be spaced some distance from the wall of the container. This is clearly shown in Figure 6. The pointer 15 is pivotally affixed to the housing 20. The housing 20 is substantially the same as the housing 16 of Figure 1. However, one leg 21 of the housing 20 is pivotally mounted on the exterior wall 22 of the round container 23. This is done by affixing a rather stiff metal wire piece 24 or some similar device at both ends to the wall 22. In passing this wire piece through cylindrical portions 25 of the leg 21 the fitting of the cylindrical portions 25 on the wire 24 is so as to offer pivotal movement. This leg 26 has an inwardly projecting stud 27 mounted thereto on which the pointer 15 freely pivots. When the housing 20 is in the position shown in Figure 4 the housing extends over the pointer 15. This is the position assumed during the normal non-pouring position of the container 23. When, however, the housing is pivoted to its position shown in Figure 5 the pointer 15 is free to pivot as shown in Figure 5. The scale 28 bears the same relationship to the wall and indicator as scale 14 in Figures 1 to 3. The scale of Figure 4 is shown, however, as the reciprocal of the scale of Figure 5 relative to the graduations thereon. In other words, scale 28 of Figure 4 shows volume remaining in the container whereas scale 28 of Figure 5 shows volume used. The theory of operation of the container and volume indicator of Figures 4 to 6 is the same as that of Figures 1 to 3.

Various modifications may be made within the spirit and scope of the invention. The pointer, for example, may be made in any convenient form and may, for example, comprise a length of wire having a loop which passes through an eye in the head of the housing in such a manner that it is capable of swinging freely in a vertical plane when in use. The housing may be permanently attached to the container by any suitable means or it may be attached when required by a rubber suction cup. In a further modification the pointer and the scale may be attached as a unit to the container, while in another modification, the calibrated scale may be freely suspended on the side of the container so that it can swing in a vertical plane when the container is tipped. A fixed pointer mounted on or attached to the container coacts with the movable scale to indicate the desired quantities.

What has been described are specific embodiments of the present invention. Other embodiments obvious to one skilled in the art from the teachings herein are contemplated to be within the spirit and scope of the following claims.

What is claimed is:

1. A container for fluent material having a pouring spout and means for indicating the volume of fluent material that has been poured from or which remains in the container, such means comprising a free-swinging pointer and a graduated scale both attached to an exterior wall of said container, said graduated scale being attached thereto in an immovable manner and said free-swinging pointer being attached thereto so that it freely swings about a pivot point under the influence of gravity as the container is tipped during the pouring operation, said pointer coacting with said graduated scale to give the desired indication on the graduated scale with respect to the contents of the container.

2. A container as defined in claim 1 in which a housing is attached to said exterior wall of the container, said housing extending over and protecting said pointer when said container is in its normal non-pouring position.

3. A container as defined in claim 2 in which said housing is elongated and is substantially L-shaped in cross-section, one leg of said L being attached to said exterior wall, and the other leg of said L being spaced from the wall and extending over the pointer when the container is in its normal non-pouring position.

4. A container as defined in claim 3 in which one leg of said L-shaped housing is attached to said exterior wall along a line parallel to the vertical axis of said container.

5. A container as defined in claim 4 in which the pointer is pivotally attached to the other leg of said L-shaped housing.

References Cited in the file of this patent

UNITED STATES PATENTS

| Number | Name | Date |
|---|---|---|
| 388,677 | Hayes | Aug. 28, 1888 |
| 790,813 | Auld | May 23, 1906 |
| 1,658,625 | Ainsworth | Feb. 7, 1928 |
| 1,665,925 | Hillyard | Apr. 10, 1928 |
| 2,383,408 | Morgan | Aug. 21, 1945 |
| 2,534,265 | Hoffman | Dec. 19, 1950 |